May 3, 1932.  D. L. JONES  1,857,050

FIXTURE SUPPORTING WEDGE

Filed May 14, 1930

WITNESSES

INVENTOR
Daniel L. Jones
BY
ATTORNEYS

Patented May 3, 1932

1,857,050

UNITED STATES PATENT OFFICE

DANIEL L. JONES, OF ORANGE, NEW JERSEY, ASSIGNOR TO J. H. BALMER CO., OF NEWARK, NEW JERSEY, A CORPORATION OF NEW JERSEY

FIXTURE SUPPORTING WEDGE

Application filed May 14, 1930. Serial No. 452,488.

This invention relates generally to supports, and has more particular reference to an improved supporting wedge, which while not necessarily restricted to such use, is especially designed for supporting and attaching bath fixtures or their equivalent to a wall.

Wedge structures for this purpose are designed to fit within a groove formed in a fixture base and depend upon an accurate fit to perform their function properly. However, in fixtures moulded from glass, porcelain or other an analogous compositions, it has been found impossible to form the groove with unerring accuracy or uniform precision, and while it has been possible in the more expensive grades of fixtures to individually treat each wedge to fit a particular fixture groove, it is apparent that in the less expensive grades of fixtures, this is impossible from a practical standpoint.

It is, therefore, the broad object of this invention to provide a wedge of the type specified and for the purpose set forth which is constructed in such a manner as to render the same capable of properly fitting the fixture base receiving grooves which vary due to manufacturing inequalities.

More specifically, the invention comprehends a fixture supporting wedge which is preferably constructed from sheet metal suitably formed to provide a base or web portion having upwardly converging side edges and formed at said side edges with outwardly diverging marginal flanges which are depressed or offset inwardly intermediate their ends to define longitudinally or vertically spaced isolated bearing surfaces, thereby reducing the points of contact of the flange surfaces with the walls of the groove in the fixture base, whereby the wedge is rendered capable of properly fitting the receiving grooves and fixture bases in which the grooves vary due to manufacturing inequalities.

The invention further resides in the shaping of the upper ends of the fixture base grooves and the wedge flanges to cooperate with each other for the purpose of effecting a final drawing or impingement of the fixture base against the wall.

Other objects of the invention reside in the simplicity of construction of the supporting wedge, the economy with which the same may be produced and the general efficiency derived therefrom.

With the above recited and other objects in view, reference is had to the following description and accompanying drawings, in which there is exhibited one example or embodiment of the invention, while the claims define the actual scope of the same.

Figure 1:
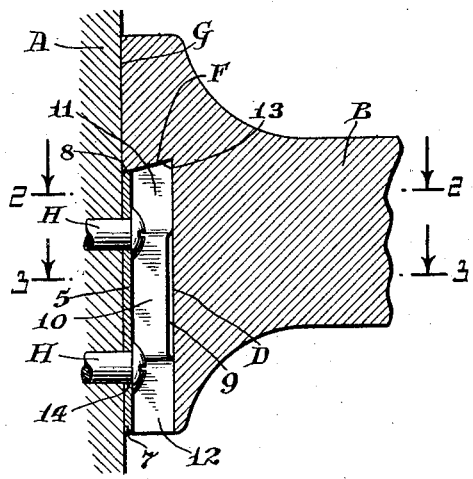
Figure 1 is a vertical fragmentary sectional view taken through a fixture base illustrating the same supported on a wedge constructed in accordance with the invention, the wedge being applied to a wall.

Referring to the drawings by characters of reference, A designates a wall or other supporting surface, to which a fixture base B is adapted to be attached, while C designates generally the supporting wedge constituting the principal subject matter of the present invention. As is customary in devices of this type, the fixture base is provided with a vertical groove D of transverse dovetail configuration which extends upwardly from the margin of the base and terminates at a point within its confines. The groove D is of gradually diminishing width from its lower end to its upper end and presents upwardly converging side walls E which are undercut or diverge downwardly. In the present instance, the upper end wall F which defines the groove is also undercut or inclines outwardly and upwardly as clearly illustrated in Figure 1 of the drawings.

Figure 2:
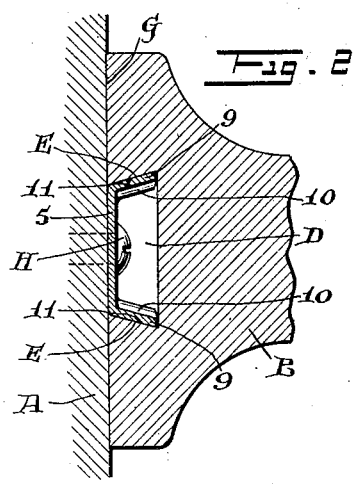
Figure 2 is a horizontal sectional view therethrough taken approximately on the line indicated at 2—2 in Figure 1.
Figure 3:
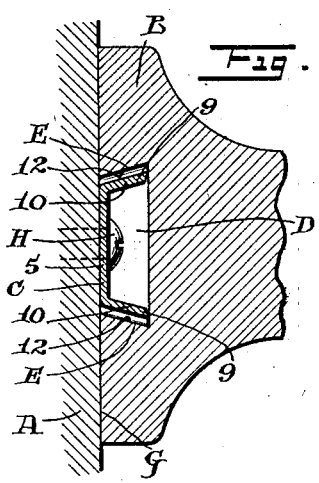
Figure 3 is a similar view taken approximately on the line indicated at 3—3 in Figure 1.
Figure 4:
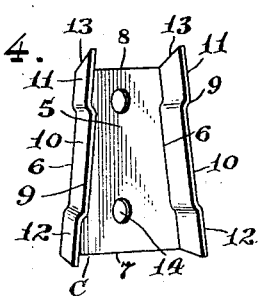
Figure 4 is a detail perspective view of the wedge alone.

The wedge C is preferably constructed from sheet metal stamped, pressed or otherwise fashioned to provide a web or base portion 5 having upwardly converging side edges 6 from its lower end 7 to its upper end 8, and the wedge is further formed at its upwardly converging side edges 6 with outwardly projecting divergent flanges 9 which are depressed as at 10 intermediate the ends to provide longitudinally or vertically spaced upper and lower outer bearing surfaces 11 and 12 which are isolated from each other and which are designed to engage with the side walls E of the groove D in the fixture base B when the fixture base is associated with the wedge, as illustrated in Figures 1, 2 and 3 of the drawings. The upper ends 13 of the flanges 9 incline upwardly and outwardly in conformity with the inclination of the upper end wall F of the fixture base groove D and coact with said wall F, to exert a final drawing in or impingement of the inner surface G of the fixture base against the surface of the wall A. The wedge C may be secured to the wall A in any desired manner, preferably by inserting through apertures 14 screws, nails or other similar fastening devices H which are anchored in the wall.

In practice, the depressed portions 10 of the flanges 9 will serve the purpose of reducing the actual area of the flanges which engage with the side walls E of the fixture base groove D, so that from a practical standpoint the wedge will properly fit the fixture base grooves which vary due to manufacturing inequalities. This will, therefore, render the use of supporting wedges for grooved fixture bases practical for the less expensive grades of fixtures, while insuring to the ultimate consumer a properly functioning attaching means for this grade of fixtures.

While there has been shown and described by way of example one embodiment of the invention, it is to be clearly understood that changes in form or variations and modifications which fall within the scope of the appended claims may be resorted to when found desirable.

What is claimed is:

1. A fixture supporting wedge adapted to fit within a grooved fixture base, said wedge having opposite side walls, each having an inwardly depressed portion intermediate its length to define on each wall longitudinally spaced side bearing surfaces for contact with the inner confronting walls of the receiving grooves at isolated points.

2. A fixture supporting wedge adapted to fit within a fixture base provided with a complemental groove, said wedge having upwardly converging and outwardly diverging opposite side walls, each of said walls having an inwardly depressed portion intermediate its length defining spaced isolated side bearing surfaces for contact with the opposite inner confronting side walls of the receiving groove.

3. A fixture supporting wedge formed from sheet material and including a web portion having upwardly converging side edges, marginal outwardly projecting divergent flanges at said side edges, each of said flanges having an inwardly depressed portion intermediate its length to define longitudinally spaced isolated side bearing surfaces for contact with the inner confronting opposite walls of a fixture receiving groove.

4. A fixture supporting wedge formed from sheet material and including a web portion having upwardly converging side edges, marginal outwardly projecting divergent flanges at said side edges, each of said flanges having an inwardly offset portion intermediate its length to define longitudinally spaced isolated side bearing surfaces for contact with the inner confronting opposite walls of a fixture receiving groove.

DANIEL L. JONES.